(12) United States Patent
Argenta et al.

(10) Patent No.: US 7,767,136 B2
(45) Date of Patent: Aug. 3, 2010

(54) APPARATUS FOR THE COMBUSTION OF GAS EXITING FROM A FURNACE, FOR THE PREHEATING OF SCRAPS ENTERING THE FURNACE ITSELF AND RELATED PROCESS

(75) Inventors: Paolo Argenta, Savona (IT); Silvio Reali, Milan (IT); Claudio Lodati, Milan (IT); Mauro Bianchi Ferri, Milan (IT)

(73) Assignee: Techint Compagnia Tecnica Internazionale S.p.A, Milan (IT)

( * ) Notice: Subject to any disclaimer, the term of this patent is extended or adjusted under 35 U.S.C. 154(b) by 258 days.

(21) Appl. No.: 11/922,669

(22) PCT Filed: Jul. 10, 2006

(86) PCT No.: PCT/EP2006/006800

§ 371 (c)(1),
(2), (4) Date: Dec. 20, 2007

(87) PCT Pub. No.: WO2007/006558

PCT Pub. Date: Jan. 18, 2007

(65) Prior Publication Data

US 2009/0031854 A1    Feb. 5, 2009

(30) Foreign Application Priority Data

Jul. 14, 2005   (IT) .......................... MI2005A1338

(51) Int. Cl.
*C21B 13/12*   (2006.01)
*C21C 5/52*    (2006.01)

(52) U.S. Cl. .......................... 266/80; 266/159; 266/901; 373/79; 373/80; 373/84; 432/121

(58) Field of Classification Search .................. 373/79, 373/80, 84; 266/80, 159, 901; 432/121
See application file for complete search history.

(56) References Cited

U.S. PATENT DOCUMENTS

| | | | | |
|---|---|---|---|---|
| 4,749,408 A | * | 6/1988 | Tate et al. | 75/10.41 |
| 5,406,579 A | * | 4/1995 | Vallomy | 373/77 |
| 6,004,504 A | * | 12/1999 | Vallomy | 266/79 |
| 2001/0055739 A1 | | 12/2001 | Vallomy | |
| 2002/0088102 A1 | | 7/2002 | Stercho | |

OTHER PUBLICATIONS

European Search Report, Feb. 12, 2007.

* cited by examiner

*Primary Examiner*—George Wyszomierski
*Assistant Examiner*—Tima M McGuthry-Banks
(74) *Attorney, Agent, or Firm*—Hedman & Costigan, P.C.; James V. Costigan

(57) ABSTRACT

Apparatus for the combustion of gas exiting from an electric arc furnace where the heat of combustion is used for the preheating of scraps entering the furnace wherein the apparatus has an insertion device for introducing comburent substance into a preheating chamber or loading tunnel for scrap metal where the loding tunnel has an inlet section for scrap metal, a seal section to prevent an uncontrolled entrance of air in the tunnel, a heating section and an unloading section for delivering scrap metal to the furnace. The insertion device for the comburent substance has one or more adjustable openings placed in the loading tunnel, and said apparatus comprises a device or a series of devices.

8 Claims, 2 Drawing Sheets

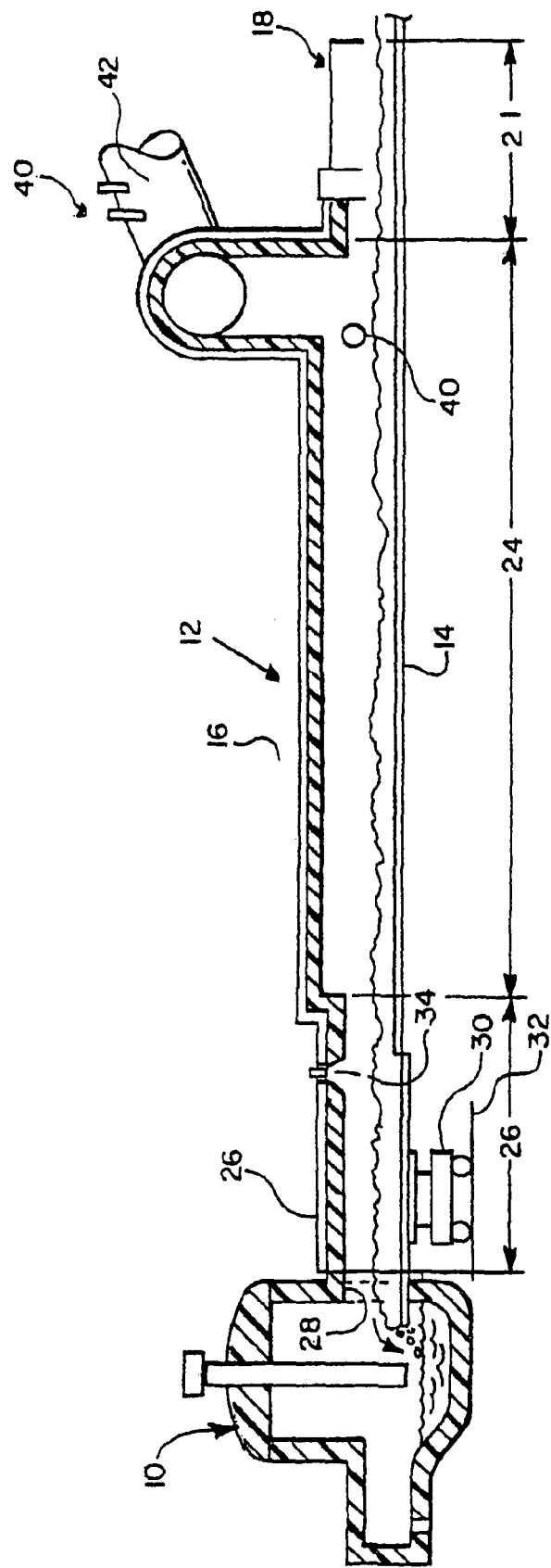

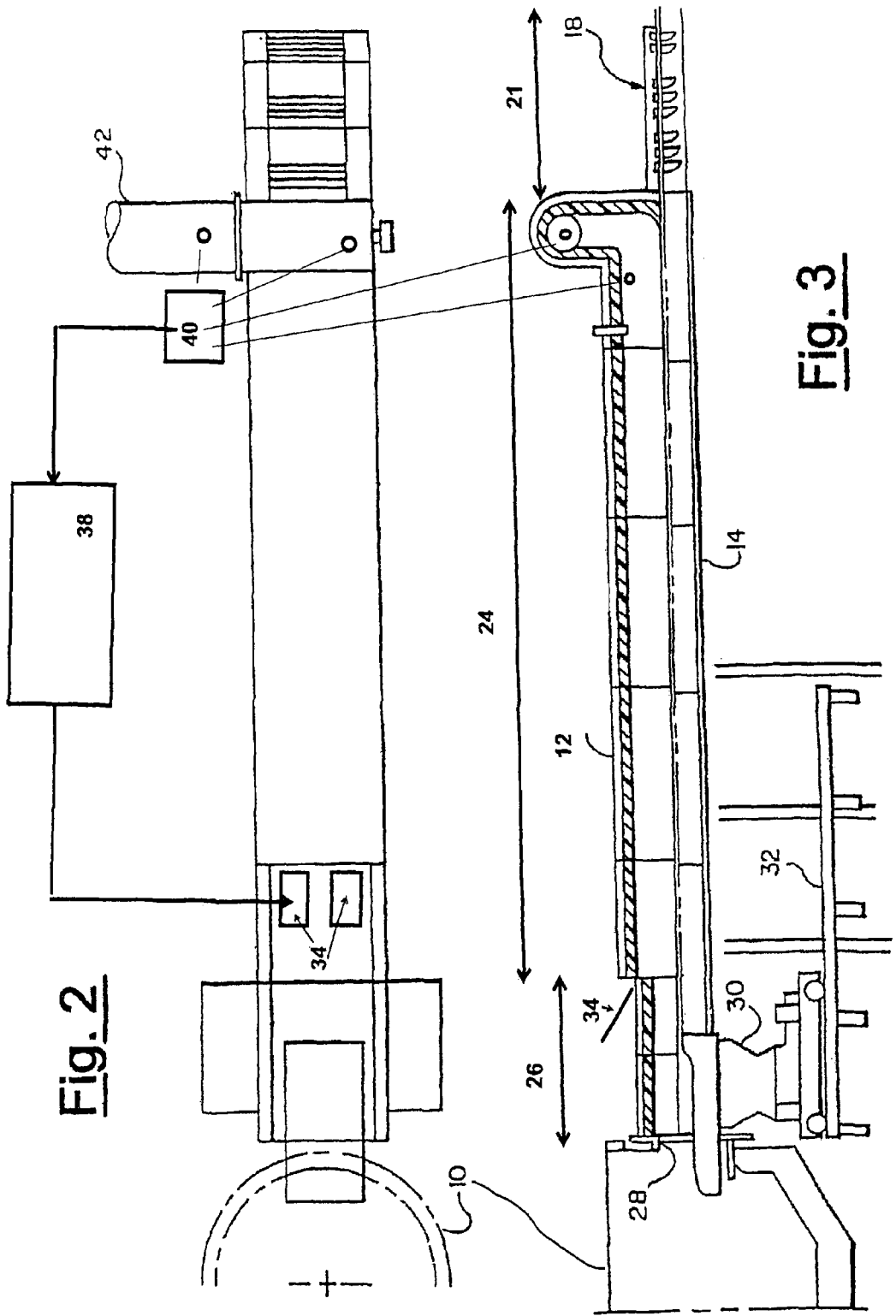

APPARATUS FOR THE COMBUSTION OF GAS EXITING FROM A FURNACE, FOR THE PREHEATING OF SCRAPS ENTERING THE FURNACE ITSELF AND RELATED PROCESS

The present invention refers to an apparatus for the combustion of gas exiting from a furnace, for the preheating of scraps entering the furnace itself and related process.

The continuous loading systems of scraps in an electric arc furnace (EAF) for the production of steel, systems such as CONSTEEL® for example, are objects of increasing interest.

A continuous loading system of scraps in an electric arc furnace coupled with a preheating system of the scrap metal entering the furnace itself permits reducing the treatment times of the scrap metal in the EAF, and reducing the EAF heat requirement, heat which is provided as electrical or chemical energy.

In the structural procedure of systems like the CONSTEEL®, a by now consolidated procedure, the loading tunnel of the scrap metal to the furnace, or preheating chamber, is found under reduced pressure with respect to the environment, acting as an actual stack, moving the hot gases generated in the EAF onto the scrap metal.

The scrap metal thus undergoes a preheating due both to the heat directly transferred from these hot gases to the scrap metal and to the heat generated from the post-combustion of gas exiting from the furnace.

To preheat the scrap metal, therefore, it is possible to take advantage of, as further energy source, the combustion of the remaining CO coming from the EAF.

Currently, in the consolidated project procedures of continuous loading systems of scrap metal to the EAF, to obtain energy from the CO, an insertion system of comburent substance (air) is used which foresees one or more ventilators and a system of ducts which brings the air along the roof and distributes it along the entire length of the loading tunnel of the scrap metal to the EAF.

The ventilators for the insertion of the comburent substance are controlled by a probe for the oxygen (or for the CO), which is placed at the bottom of the loading channel or tunnel, near the reception zone of the cool scraps in the loading tunnel.

Depending on the nature of the probe, the probe will detect the absence of CO or the presence of $O_2$ in this zone of the scrap metal channel of loading to the furnace. The absence of CO (or the presence of $O_2$) implies that the combustion reactions are completely finished and have led to the extraction of the maximum possible heat.

Nevertheless, a system of this type has considerable drawbacks deriving from a very complex response cycle. Such system is characterised, in fact, by a non-immediate response and by a consequent slowness in carrying out the necessary adaptations of the system itself for optimising the feeding of comburent substance as a function of the obtained results.

In fact, if for example the control probe recognises the need to inject the comburent substance, the response cycle foresees the opening of the gates for the insertion of air, the actuation of the ventilators for moving the air into the ducts which bring the air along the tunnel roof and the distribution of the air itself along the entire length of the loading tunnel or channel of the scrap metal to the EAF.

The time necessary to carry out such actions is rather long and reduces the overall efficiency of the system.

In addition to the non-optimal response times, a further drawback of the system according to the state of the art regards the high production and maintenance costs (service operations and failure possibilities) also considering the high number of mechanical elements (ventilators, ducts, gates) which can be or are subject to failure.

The preheating system according to the state of the art moreover foresees a further device called "Dynamic Seal". The Dynamic Seal is a ventilator system with variable capacity, controlled by pressure sensors which remove the air at the inlet point of the scrap metal in the loading channel and which, therefore, prevent the uncontrolled entrance of air above and through the scrap metal. This element of the system is costly, complex, difficult to calibrate and control. The presence of an aspirator in the inlet zone of the scrap metal loading channel, moreover, inserts dust into the surrounding zone coming from the scrap metal or from the lightest portion of the lime added as additive to the load entering the furnace.

General object of the present invention is hence to resolve the abovementioned drawbacks in a simple, economical and particularly functional manner.

Particular object is to realise an apparatus for the combustion of the gases exiting from an electric arc furnace for preheating the scraps entering the furnace itself and the related process, and which permits greater cleanliness at the workplace.

In view of the aforesaid objects, object of the present invention is an apparatus for the combustion of gas exiting from an electric arc furnace for the preheating of scraps entering the furnace itself, characterised in that it foresees a device for the introduction of comburent substance into a preheating chamber or loading tunnel of the scrap metal, having an inlet section of the scrap metal, a seal section to prevent the uncontrolled entrance of air in the tunnel, a heating section and an unloading section of the scrap metal in the furnace, said insertion device of the comburent substance comprising one or more adjustable openings placed in the loading tunnel, and said apparatus comprising a device, or a series of devices, of mechanical seal nature, placed in the insertion or inlet section of the scrap metal in the loading tunnel or preheating chamber.

A further object of the present invention is a process for the combustion of gas exiting from an electric arc furnace, for the preheating of furnace load material entering the furnace itself for the production of steel, comprising the following steps:
 loading the load material or scrap metal to be fed to the furnace, in an extended preheating chamber or loading tunnel, having in sequence: an entrance section of the scrap metal, a seal section to prevent an uncontrolled entrance of air into the tunnel, a preheating section and an unloading section of the scrap metal in the furnace;
 preheating the scrap metal by means of heat transfer from the hot gases leaving the furnace, which pass through and above the scrap metal inside the chamber;
 and preheating the scrap metal by means of heat produced by the combustion, inside the chamber, of the unburnt CO coming from the furnace;

said process being characterised in that the insertion of comburent substance is realised through an insertion device of the comburent substance comprising one or more adjustable openings in the insertion section of the scrap metal in the furnace and mechanical means, also not equipped with autonomous movement, adapted for reducing of the air insertion in the inlet section of the scrap metal in the loading tunnel or preheating chamber.

In particular, the adjustable openings are placed on the roof of the loading tunnel near the furnace, and more precisely in the inlet section of the scrap metal in the furnace or scrap metal unloading section.

Preferably, the insertion device of the comburent substance in the apparatus according to the present invention, comprising one or more adjustable openings placed in the loading tunnel, consists of at least one slit of variable opening situated in the insertion zone of the scrap metal in the furnace, such opening being connected to a centralised control and drive system.

Such centralised control and drive system acquires a signal from the probe; the probe can be an $O_2$ or CO probe.

As indicated above, the insertion device of the comburent substance (preferably air), situated in the inlet section of the scrap metal in the furnace or unloading section of the scrap metal, can be integrated by an improved, simplified and low cost device, which reduces the introduction of comburent substance in the inlet section of the scrap metal in the loading channel and, at the same time, reduces the emission of dust into the surrounding environment.

Such improved and simplified device which reduces the uncontrolled introduction of comburent substance in the tunnel and improves the environmental impact in the workplace corresponds to the mechanical seal device of the apparatus according to the present invention, placed in the insertion section of the scrap metal in the loading tunnel.

The mechanical seal device, placed in the inlet section of the scrap metal in the loading tunnel, is formed by at least one rubber or metal gate.

In particular, the mechanical seal, placed in the insertion section of the scrap metal in the loading tunnel, is formed by zero to five gates placed in the inlet section of the insertion section of the scrap metal in the preheating chamber, or cool part, zero to five gates in the intermediate section of the insertion section of the scrap metal in the preheating chamber and zero to five gates in the outlet section, or warmest part, of the inlet section of the scrap metal in the preheating chamber.

Moreover, the gates in the inlet section of the insertion section of the scrap metal in the preheating chamber, or cool part, are thin and flexible or finger-like, made of rubber or metal, i.e. they are flexible tubes or thin flanking laminae.

The gates in the intermediate section of the insertion section of the scrap metal in the preheating chamber are metal sheets with flanking flexible laminae, while the gates in the outlet section, or the warmest part of the insertion section of the scrap metal in the preheating chamber, are composed of massive, iron panels, hinged to the fixed upper structure of the channel.

In fact, in such innermost part of the loading channel or tunnel, the gates are directly exposed to the flow of hot gases coming from the furnace and from the heat radiated from the furnace and from the warmest part of the loading channel.

Such mechanical device ensures a strong reduction of the air flow, making the presence of the "Dynamic Seal" superfluous.

All of these solutions in fact permit following the edge of the scraps, reducing the total flow of air in the channel. The absence of a ventilator which suctions directly from the scrap metal eliminates the problem of the environmental emission of the dust present on the scrap metal (accumulated by piling in open-air deposits) as well as the lightest portions of the additive materials on the scrap metal.

The substantial advantage of the system according to the present invention consists in a substantial reduction of the response times such to permit obtaining a response in real time and a significant improvement of the environmental impact characteristics of the line.

A further advantage of the system according to the present invention is its greater simplicity, since the various gates and ventilators foreseen in the systems according to the state of the art have been eliminated.

The apparatus and process according to the present invention have a further considerable economical advantage (regarding the initial investment and the conduction and maintenance costs as well as those pertaining to the system availability), since they also permit eliminating the "Dynamic Seal" from the continuous preheating system of scraps.

The apparatus according to the present invention, which permits excluding such component, is therefore advantageously less burdensome (in terms of equipment cost and maintenance and service costs), simpler and more reliable than that traditionally obtained with a "Dynamic Seal".

The solution according to the present invention moreover has the advantage of an improved and more targeted control of the comburent substance (for example air) in order to complete the combustion of combustible substances present in the scrap metal. All this improves the efficiency of the line (in terms of quality and cost per ton of the final product) as well as its environmental impact both at the factory level and regarding the overall atmosphere emissions.

Object of the present invention is also a process for refining steel comprising:
  continuous preheating of the load material;
  feeding of said material containing iron, directly reduced iron, or a blend of both in an electric arc furnace in order to perform smelting and refining operations;
  feeding of slag-forming elements in the bath for steel production;
  introduction of carburising elements in the furnace for steel production;
  electrical heating of the load using electrodes to melt the load and form a bath of melted metal in the furnace with a layer of melted slag on said melted metal bath;
  maintaining said slag in a foamy condition during the steel production process;
  feeding of metal elements, slag formers and carburising elements into said furnace;
  maintaining full electrical power capacity in said furnace for the total loading, smelting and refining time;
  intermittent tapping from the furnace, maintaining a liquid metal heel inside the furnace shell, said liquid metal heel approximately representing a weight that varies between 10% and 30% of the weight prior to tapping;

such process being characterised in that the preheating step of the melted material in turn comprises the following steps:
  loading of the material, or scrap metal, to be fed to the furnace, into an extended preheating chamber or loading tunnel having in sequence: an inlet section of the scrap metal, a seal section to prevent an uncontrolled entrance of air into the tunnel, a preheating section and an unloading section of the scrap metal into the furnace.
  preheating of the scrap metal by means of heat transfer from the hot gases exiting the furnace which pass through and above the scrap metal within the chamber;
  and preheating of the scrap metal by means of heat produced from the combustion inside the chamber of the unburnt CO coming from the furnace;

said process being characterised in that the insertion of comburent substance is realised through an insertion device of the comburent substance comprising one or more adjustable openings in the inlet section of the scrap metal into the furnace and mechanical means, also not equipped with autonomous movement, adapted to reduce the introduction of air in the inlet section of the scrap metal in the loading tunnel or preheating chamber.

Object of the present invention is also an apparatus for steel refining comprising:
- an electric arc furnace for the production of steel for smelting and refining a load of metal at its interior;
- electrodes which extend into said furnace to a distance below the slag level in a bath of melted material therein contained;
- feeding means connected to said furnace for the introduction of load materials inside said furnace without the removal of the electrodes;
- post-combustion means associated to cooperate with said feeding means in order to preheat the load materials inside said feeding means;
- means for measuring and controlling load material or scrap metal feeding comprising an automatic control device for the load material or scrap metal, and a device for measuring the added load material, in correlation with the automatic control device;
- a mechanical seal device located in the insertion section of the load material to the feeding means;
- gas injection means that communicate with said furnace above and/or below the normal melted metal level in the bath; and
- means for tilting said furnace for slagging and tapping operations, the tapping means being arranged in a manner so that said slant of said furnace will maintain a heel of melted liquid material inside said bath, said heel having a weight that varies approximately between 10% and 30% of the weight prior to tapping.

The structural and functional characteristics of the present invention and its advantages in relation to the prior art will be made clearer and more obvious from the following description, with reference to the appended drawings wherein:

FIG. 1 is a vertical section of an embodiment of the apparatus according to the present invention;

FIG. 2 is a top view of the apparatus of FIG. 1;

FIG. 3 is a vertical section of the apparatus of FIG. 1 according to the present invention;

With reference to the drawings, in general and to FIG. 1 in particular, an embodiment of an apparatus is shown according to the present invention, where an electric arc furnace for the production of steel 10 has an extended preheating chamber or tunnel 12, preferably a vibrating channel, for inserting the both metal and non-metal load materials into the furnace.

The furnace 10, represented as a three-phase electric furnace, can also alternatively be a continuous current furnace, a plasma furnace or an induction furnace.

The preheating tunnel or chamber 12 has an extended support 14 covered by a corresponding extended shield, preferably coated with refractory material.

The preheating chamber or tunnel 12 has a mechanical seal device 18 at the inlet end of the load material, and starting from the inlet end of the load material, the preheating tunnel or chamber sequentially comprises an inlet or insertion section of the load material 21, comprising the seal system 18 for preventing an uncontrolled entrance of air into the tunnel, one or more heating sections or zones 24, and a material unloading section 26.

The furnace 10 has an outlet opening 28 of the emission gases.

The unloading section of the material of the preheating tunnel is mounted on a connection trolley 30 for an axial telescopic movement in engagement with the opening of the furnace 28 which effectively and sealingly connects the stationary tunnel or chamber 12 with the furnace 10, which can be tilted.

The connection trolley feeds the scraps from the preheating tunnel or chamber to the furnace, in the correct zone inside the furnace.

The connection trolley is advantageously mounted on a track 32.

The emission gases of the furnace 10, rich in CO and whose temperature is generally around 1300° C., enter into the heating chamber 12 of the scraps (which the smoke outlet duct 42 places under reduced pressure) through the material unloading opening 28.

The emission gas of the furnace provides the heating in the preheating chamber of the load material in two main ways: by means of the considerable heat of the gas itself (which flows through the scrap metal) and by means of the combustion of the unburnt CO present in the emission gases of the furnace.

The heating section 24 is provided with one or more adjustable openings 34 placed in the loading tunnel in the area of the section 26 close to the insertion zone of the preheated scrap metal in the furnace, opening 34 being connected to a centralised control system (38, shown in FIG. 2).

The combustion of the CO coming from the furnace (the chemical reaction between the combustible material —CO— and comburent substance—for example air) is ensured, sustained, and maintained by the temperature of the gases (up to 1,300° C.) which in any case exceeds the fire point.

The variable opening of the slit(s) 34 (and in general the injection of the comburent substance) is governed by the line controller in (direct or inverse) proportion to the signal extracted from the CO or $O_2$ probe (40).

An oxygen or CO probe 40 is arranged either in the outlet section 42 or still in the zone 24 but close to the smoke outlet duct 42 (as seen in FIG. 2).

This probe 40 controls the introduction of air through the insertion device comprising the adjustable opening 34 to allow the operating conditions to vary rapidly in response to the composition variations of the emission gases from the furnace.

The oxygen probe 40, which can also be a multiple gas analyser, operates on the adjustment of the comburent insertion device and on the level of combustion in the chamber 12.

A small quantity of air enters into the seal zone 21 to prevent an uncontrolled entrance of air in the tunnel 12 through the mechanical seal device 18.

The scraps load enters into the preheating chamber on a belt through mechanical seal closure 18.

The device of treatment of the emission gases and suction of the preheater is connected to the chamber 12 in proximity to and above the mechanical seal closure 18 through the duct 42.

The protective scope of the invention is therefore defined by the attached claims.

The Invention claimed is:

1. Apparatus for the combustion of gas exiting from an electric arc furnace for the preheating of scraps entering the furnace itself, comprising a preheating chamber or loading tunnel of the scrap metal having in sequence an insertion section of the scrap metal, a seal section to prevent an uncontrolled entrance of air in the loading tunnel, a heating section and an unloading section for scrap metal in the furnace, and being associated to a smoke outlet duct, wherein said apparatus is provided with an insertion device of a comburent substance into said preheating chamber or loading tunnel and comprises a centralised control system, an $O_2$ or CO probe, which is located in or close to said smoke outlet duct, and a mechanical seal device or a series of mechanical seal devices placed in the insertion section of the scrap metal in the loading tunnel or preheating chamber, and wherein said insertion device of the comburent substance comprises one or more adjustable openings which are placed on the roof of said preheating chamber or loading tunnel at said unloading section of the scrap metal in the furnace and which are connected to the centralised control system, which centralised control system acquires a signal from said $O_2$ or CO probe, computes the required comburent air in proportion to said signal and governs the variable opening of said adjustable openings accordingly.

2. Apparatus according to claim 1 characterised in that the mechanical seal device, placed in the insertion section of the scrap metal in the preheating chamber or loading tunnel, is made of at least one rubber or metal gate.

3. Apparatus according to claim 2, wherein said insertion section of the scrap metal in the preheating chamber or loading tunnel comprises an inlet section or cool part, an intermediate section and an outlet section or warmest part, said mechanical seal device being made of zero to five gates placed in the inlet section of the insertion section of the scrap metal in the preheating chamber, or cool part, zero to five gates in the intermediate section of the insertion section of the scrap metal into the preheating chamber, and zero to five gates in the outlet section, or warmest part, of the insertion section of the scrap metal in the preheating chamber.

4. Apparatus according to claim 3, characterised in that the gates in the inlet section of the insertion section of, the scrap metal in the preheating chamber, or cool part, are thin and flexible or finger-like, made of rubber or metal, i.e. they are flexible tubes or thin flanking laminae.

5. Apparatus according to claim 3, characterised in that the gates in the intermediate section of the insertion section of the scrap metal in the preheating chamber are made of metal sheets with flanking flexible laminae.

6. Apparatus according to claim 3, characterised in that the gates in the outlet section, or warmest part, of the insertion section of the scrap metal in the preheating chamber are composed of massive, iron panels hinged to the fixed upper structure of the channel.

7. Apparatus according to claim 1, characterised in that it has a mechanical seal device integrated with a dynamic closure device or Dynamic Seal.

8. Apparatus for the refining of steel comprising:
an electric arc furnace for the production of steel for smelting and refining a load of metal at its interior Apparatus for the refining of steel comprising:
electrodes which extend into said furnace to a distance below the slag level in a bath of melted material therein contained;
feeding means comprising a preheating chamber or loading tunnel of scrap metal connected to said furnace for the introduction of load materials inside said furnace without the removal of the electrodes;
post-combustion means adapted to post-combust the unburnt CO present in the emission gases of the furnace and which are associated to cooperate with said feeding means in order to preheat the load materials inside said feeding means;
load material or scrap metal feeding measuring and controlling means comprising an automatic control device for the load material or scrap metal, and a device for measuring added load material, in correlation with the automatic control device;
a mechanical seal device located in a section where the load material is added to the feeding means;
gas injection means that communicate with said furnace above and/or below the normal melted metal level in the bath; and
said furnace being adapted to tilt on a slant for slagging and tapping operations in a manner so that said slant of said furnace will maintain a heel of melted liquid material inside said bath, said heel having a weight that varies approximately between 10% and 30% of the weight prior to tapping, wherein:
said feeding means for the introduction of load materials inside said furnace comprise a preheating chamber or loading tunnel of scrap metal having in sequence an insertion section of the scrap metal, a seal section to prevent an uncontrolled entrance of air in the loading tunnel, a heating section and an unloading section of the scrap metal in the furnace, and being associated to a smoke outlet duct at which an $O_2$ or CO probe is located, and wherein
said post-combustion means comprise an insertion device of a comburent substance which insertion device comprises one or more adjustable openings which are placed onthe roof of said preheating chamber or loading tunnel at said unloading section of the scrap metal in the furnace and which are connected to a centralised control system which acquires a signal from said $O_2$ or CO probe, computes the required comburent air in proportion to said signal and governs the variable opening of said adjustable openings accordingly.

* * * * *